US012145817B2

(12) United States Patent
Peleman et al.

(10) Patent No.: US 12,145,817 B2
(45) Date of Patent: Nov. 19, 2024

(54) FOLDING DEVICE TO MAKE TWO PARALLEL FOLDS IN A LEAF OF PAPER OR THE LIKE

(71) Applicant: Peleman Industries, Naamloze Vennootschap, Puurs (BE)

(72) Inventors: Guido Frans Maria Jozef Peleman, Knokke-Heist (BE); Maarten Hennissen, Beveren (BE)

(73) Assignee: PELEMAN INDUSTRIES, NAAMLOZE VENNOOTSCHAP, Puurs (BE)

(*) Notice: Subject to any disclaimer, the term of this patent is extended or adjusted under 35 U.S.C. 154(b) by 184 days.

(21) Appl. No.: 17/312,789

(22) PCT Filed: Nov. 8, 2019

(86) PCT No.: PCT/IB2019/059601

§ 371 (c)(1),
(2) Date: Jun. 10, 2021

(87) PCT Pub. No.: WO2020/121082

PCT Pub. Date: Jun. 18, 2020

(65) Prior Publication Data

US 2022/0048723 A1 Feb. 17, 2022

(30) Foreign Application Priority Data

Dec. 12, 2018 (BE) .................................. 2018/5879

(51) Int. Cl.
*B65H 45/16* (2006.01)
*B42C 5/00* (2006.01)

(52) U.S. Cl.
CPC ................ *B65H 45/16* (2013.01); *B42C 5/00* (2013.01)

(58) Field of Classification Search
CPC ......... B65H 45/16; B42C 5/00; B31F 1/0012; B31F 1/0022; B31F 1/0025; B31F 1/2859;
(Continued)

(56) References Cited

U.S. PATENT DOCUMENTS 2,245,891 A 11/1938 Ackley
2,455,971 A * 12/1948 Bosch ........................ B42C 5/06 118/238
(Continued)

FOREIGN PATENT DOCUMENTS

BE 1021551 B1 12/2015
BE 1023784 A1 7/2017
(Continued)

OTHER PUBLICATIONS

International Search Report issued Jan. 8, 2020 which pertains to PCT/IB2019/059601 filed Nov. 8, 2019, 3 pages.
(Continued)

*Primary Examiner* — Sameh Tawfik
(74) *Attorney, Agent, or Firm* — Dinmore & Shohl LLP

(57) ABSTRACT

Folding device to make two parallel folds in a leaf whereby the device contains two clamps with a folding edge, each formed by two clamping bars with jaws which can be moved relative to each other between an open position and a closed position and whereby the clamps to feed the leaf are arranged opposite each other with their folding edges parallel and facing each other at a distance equal to the desired distance between the folds to be made and whereby the folding device also a carrier to move the clamps in their closed position relative to each other in such a way that one of the clamps with its folding edge makes a circular movement around the folding edge of the other clamp to form both parallel folds at the folding edges of both clamps.

17 Claims, 7 Drawing Sheets

(58) Field of Classification Search
CPC .............. B31F 5/005; B31F 2201/0764; B31F 2201/0771
USPC ........................................................ 493/405
See application file for complete search history.

(56) References Cited

U.S. PATENT DOCUMENTS

| | | | | | |
|---|---|---|---|---|---|
| 3,451,082 | A * | 6/1969 | Sarring | B42C 13/003 | 412/22 |
| 4,518,296 | A * | 5/1985 | Pearson | B42C 9/0056 | 412/37 |
| 4,978,267 | A * | 12/1990 | Kolkhorst | B42C 11/04 | 412/4 |
| 5,011,187 | A * | 4/1991 | Hunder | B42C 9/0056 | 412/8 |
| 5,114,293 | A * | 5/1992 | Rathert | B42C 5/02 | 412/30 |
| 5,556,244 | A * | 9/1996 | Begemann | B42C 5/02 | 412/30 |
| 5,658,111 | A * | 8/1997 | Rathert | B42C 5/02 | 412/30 |
| 6,497,544 | B1 * | 12/2002 | Schmucker | B42C 11/00 | 412/17 |
| 6,726,424 | B2 * | 4/2004 | Voss | B42C 11/04 | 270/58.08 |
| 7,134,823 | B2 * | 11/2006 | Albrecht | B42C 13/003 | 412/22 |
| 7,686,557 | B2 * | 3/2010 | Albrecht | B42C 5/02 | 412/22 |
| 2015/0283843 | A1 * | 10/2015 | Peleman | B42C 19/02 | 428/68 |

FOREIGN PATENT DOCUMENTS

| | | | |
|---|---|---|---|
| BE | 1024330 | A1 | 1/2018 |
| BE | 1024709 | A1 | 5/2018 |
| EP | 2917040 | B1 | 9/2016 |
| WO | 2014/072778 | A1 | 5/2014 |

OTHER PUBLICATIONS

Written Opinion issued Jan. 8, 2020 which pertains to PCT/IB2019/059601 filed Nov. 8, 2019, 4 pages.

* cited by examiner

FOLDING DEVICE TO MAKE TWO PARALLEL FOLDS IN A LEAF OF PAPER OR THE LIKE

CROSS-REFERENCE TO RELATED APPLICATIONS

The present application is the National Phase entry of International Patent Application No. PCT/IB2019/059601 filed Nov. 8, 2019, the entire contents of which are hereby incorporated by reference into this application.

TECHNICAL FIELD

The present disclosure relates to a folding device to make two parallel folds in a leaf of paper or the like, particularly two parallel folds at a short distance from each other of, for example, two millimetres.

BACKGROUND

Double folded leaves are used, for example, for the composition of a book, whereby the double fold of such leaves delimits a foldable strip with which the leaves can be bound in a binding element or in the spine of a book or the like.

An advantage of such leaves is that the leaves of the book can be folded open flat and the print continues seamlessly over the folded open leaves as specified in BE 1.023.784.

Different methods and devices are known to provide leaves of paper with a fold.

BE 1.021.551 discloses a folding device with which the paper is folded upward once and folded downward once and whereby this process is possibly repeated several times, for example three times.

A disadvantage of this folding device is that the folding process is slow as the operation needs to be repeated, for example, three times, to obtain a good result. The result itself is good, but the device is not suitable for mass industrial production due to its slowness.

BE 1.024.330 discloses another folding machine with which leaves of paper can be folded by means of steel bands with a much higher theoretical production rhythm, but whereby in practice the production yield is not that high for different reasons, more specifically due to:

- difficult positioning of the paper on the steel bands because of the weak grip of the steel on the paper;
- difficulty to perfectly guide the steel bands, causing great wear and tear on the steel bands; and,
- the fact that to make a second fold at a distance from the first fold, the paper must be guided through the folding machine either a second time or a second folding machine must be placed behind the first one, making the machine unpractically long.

BE 1.024.709 describes an improved version of the previous folding machine in which the steel bands are replaced by several synthetic pull-through belts, which have a strong adhesion to the paper, such that the paper stays in place much better during the transport with these pull-through belts. In this folding machine, the paper is subjected to three successive operations for each folding side: grabbing, folding and pressing and this up to four times. However, this improved folding machine has three weaknesses, more specifically:

- the first fold, with right and left fold, requires belts of approximately two metres in length and for the second fold the paper must be rotated back 180°, which is a weakness as the paper must not move in the slightest to make a perfectly parallel second fold and this rotating back is always delicate, particularly when changing sizes or types of paper or thicknesses of paper;
- the synthetic pull-through belts are suitable to handle paper on A4 format, but for larger paper formats the grip on the paper by the pull-through belts turns out to be insufficient, such that the paper can turn slightly, which is very bad for the rotating back and the positioning of the second fold which is no longer parallel then, which is a problem knowing that the market is always demanding larger paper formats, even up to B2 (500×707 mm), which requires a folding machine in excess of a metre high, which is very problematic for the length of the conveyor belts and for the height of the machine; and,
- the synthetic pull-through belts are perfectly suitable to handle paper with a density of 250 $gr/m^2$, but for heavier types of paper the grip on the paper by the conveyor belts turns out to be too weak because the rigidity of the paper against folding causes the paper to turn slightly which causes problems for the positioning of the second fold, which is then no longer parallel.

The purpose of the present disclosure is to provide a solution to one or more of the aforementioned and other disadvantages.

SUMMARY

To this end, the present disclosure relates to a folding device to make two parallel folds at a distance from each other in a leaf of paper or the like, characterised in that the device contains two clamps which end in a sharp, pointed folding edge, each formed by two clamping bars with pointed jaws which can be moved relative to each other between an open position with an opening between the clamping bars to feed the leaf to be folded and a closed position for clamping the leaf to be folded during the folding, whereby the clamps to feed the leaf are arranged opposite each other with their folding edges parallel and facing each other at a distance from each other equal to the desired distance between the folds to be made and whereby the device also includes a carrier to move the clamps relative to each other in their closed position in such a way that one of the clamps with its folding edge makes a circular movement around the folding edge of the other clamp to form both parallel folds at the level of the folding edges of both clamps.

With this folding device the leaves to be folded can be guided one by one from a feeder between the clamping bars through the device in a flat linear track without having to rotate back the leaf and after folding the leaves can be guided further and stacked.

By the relative rotational movement of the one clamp relative to the other clamp, both parallel folds in the leaf are simultaneously realised at the level of the sharp folding edges of the clamps that are at the desired distance from each other and remain at this distance during the entire rotational folding movement.

For the whole duration of this relative rotational movement for folding, the leaf of paper remains firmly clamped between the clamping bars, such that the leaf cannot move and the realised folds are always perfectly parallel.

The folding device according to the present disclosure is also suitable for larger formats of leaves, as they can be processed without any problem because the leaves can be guided in flat without rotating or folding.

Heavier types of paper can also be processed without any problem as the paper is clamped securely and there are no forces to twist or rotate the paper.

An added advantage is that the two folds can be made in any random location of the leaf.

On one leaf several double folding lines can be created at different positions, which, in addition to the application as described in BE 1.023.784 for folding open leaves of a book in a flat way, can also be useful to fold greeting cards or book covers for example According to a practical embodiment, one of both clamps is fixed in the guide direction of the leaves, whereas the other clamp is movable relative to the fixed clamp, such that only one of both clamps must be moved and a simple drive is sufficient for this.

In some embodiments, at least one stop is provided for the folding edge of a clamp at the end of the rotational movement of this clamp, such that an even sharper fold can be realised.

In some embodiments, such a stop for the folding edge is made from an elastic compressible material such as rubber.

In some embodiments, the clamps are rotatable relative to each other over an angle of at least 180°, or over an angle whereby one clamp is rotated against or almost against the other clamp, in both directions of rotation.

This allows the leaf to be folded over to both sides of the leaf, resulting in a sharp fold.

The opening angle of the pointed folding edge is 25°, for example, such that the leaf can be folded over a big angle around the folding edges of the clamps.

BRIEF DESCRIPTION OF THE DRAWINGS

With the intention of better showing the characteristics of the present disclosure, a few embodiments of a device according to the present disclosure to make two parallel folds in a leaf of paper are described hereinafter by way of an example, without any limiting nature, with reference to the accompanying drawings, wherein:

FIG. 3 schematically shows the folding device of FIG. 1 in a first rotated position;

DETAILED DESCRIPTION

Figure 1:
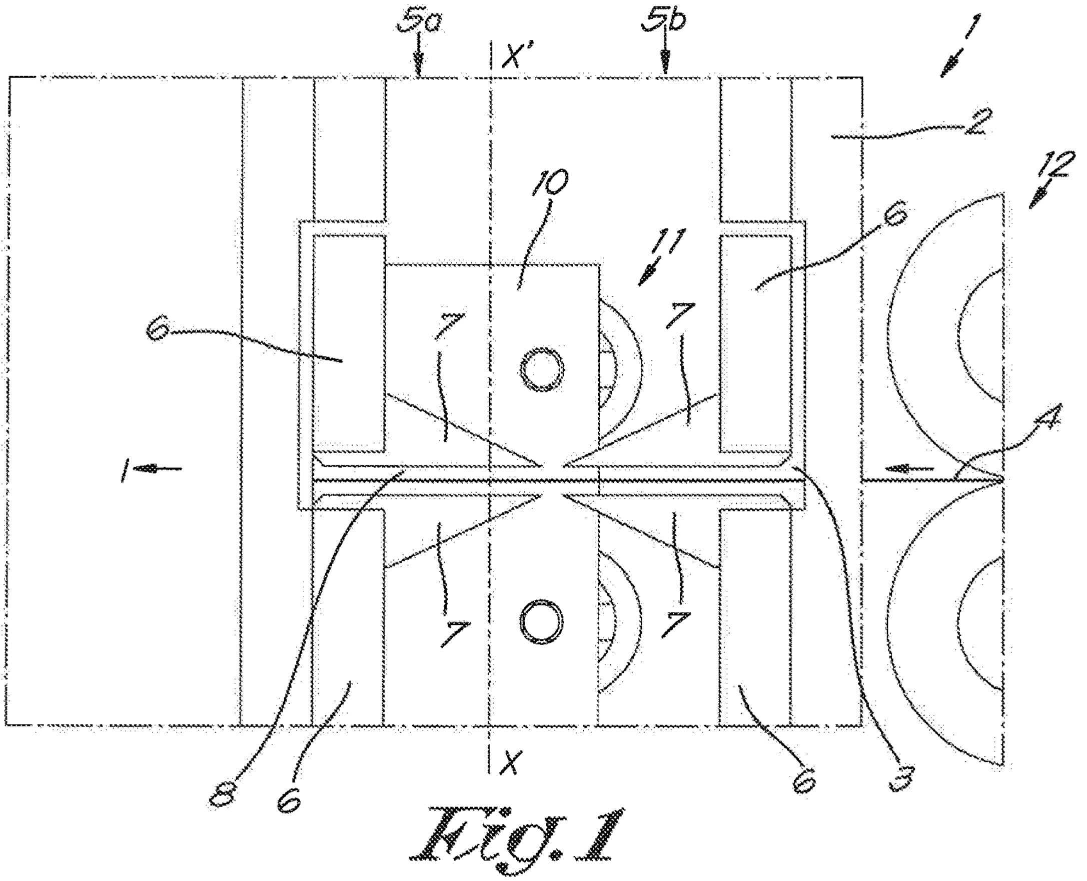
FIG. 1 schematically shows a folding device according to the present disclosure in idle position.

The folding device 1 of FIG. 1 contains a chassis 2 with a feed opening 3 for the flat feeding of a leaf 4 of paper to be folded or the like according to a feed direction I as shown with arrow I in FIG. 1.

The device contains two clamps **5*a* and 5*b* to clamp the leaf 4**.

The clamps **5*a* and 5*b* are made of two clamping bars 6 with pointed jaws 7**.

Figure 2:
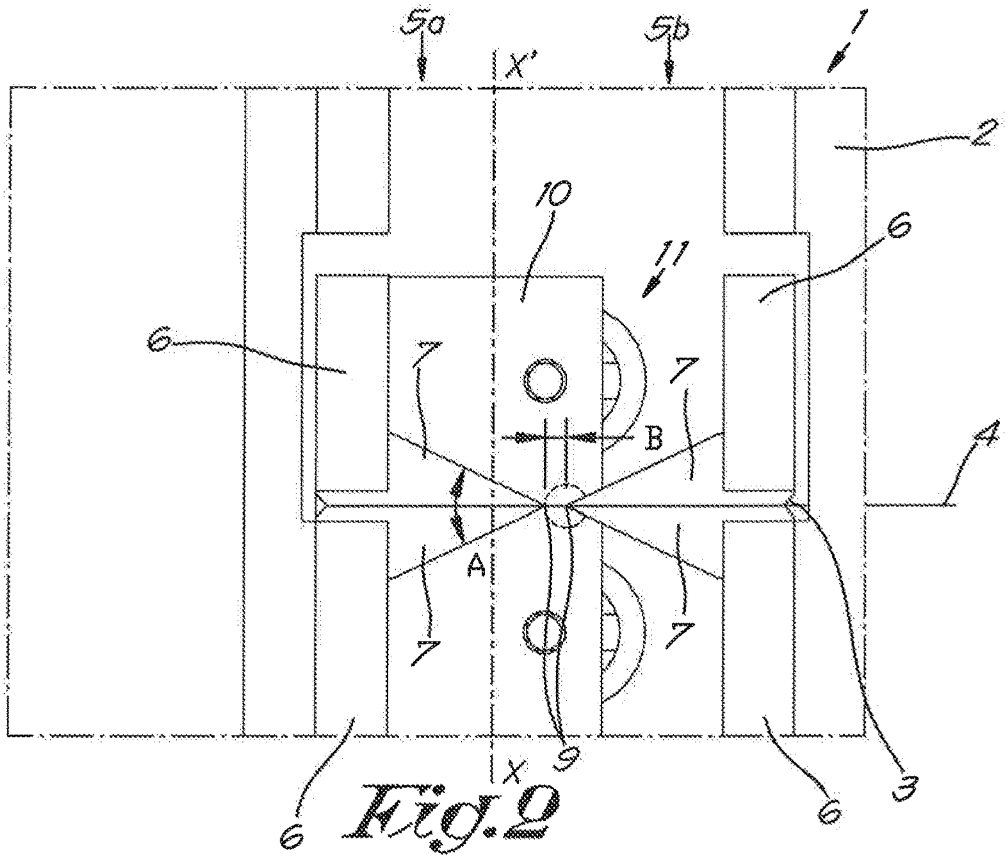
FIG. 2 schematically shows the folding device of FIG. 1 in closed position.

The clamping bars 6 are movable relative to each other according to a direction X-X' perpendicular to the feed direction I between an open position, as shown in FIG. 1, with an opening 8 between the clamping bars 6 to feed the leaf 4 to be folded and a closed position as shown in FIG. 2 to clamp the leaf 4 to be folded during the folding.

In the open feed position of FIG. 1 the openings 8 are located between the clamping bars 6 in the extension of the feed direction I, such that the openings 8 delimit a guide channel where the leaf 4 to be folded can be fed in a linear way without rotating or folding.

In the closed position of FIG. 2 the pointed jaws 7 of each of the clamps **5*a* and 5*b* form a sharp folding edge 9 of each of the clamps 5*a* and 5*b*** in question with an opening angle A of the pointed folding edge amounting to approximately 25°.

In this position the clamps **5*a* and 5*b* are directly opposite each other with their sharp folding edges 9** parallel to each other and facing each other at a distance B from each other which is equal to the desired distance between the folds to be made.

The clamp **5*b* is a fixed clamp, which means that this clamp 5*b* has a fixed position relative to the feed direction I, although the jaws 7 have been mounted movably in the direction X-X', for example in linear guides of the chassis 2**.

The clamping bars 6 of the clamp **5*a* have been mounted together on a carrier 10 which is movably mounted in the chassis 2 and on which the clamping bars 6** are slidably mounted in linear guides which extend according to the direction X-X'.

The folding device 1 is further provided with a rotating mechanism 11 to rotate the carrier 10 together with the clamp **5*a* in such a way that the folding edge 9 of the clamp 5*a* makes a circular movement around the folding edge 9 of the fixed clamp 5*b*, as shown by the dashed circle in FIG. 2 with a radius equal to the aforementioned distance B and centre point on the level of the folding edge 9 of the fixed clamp 5*b***.

Figure 5:
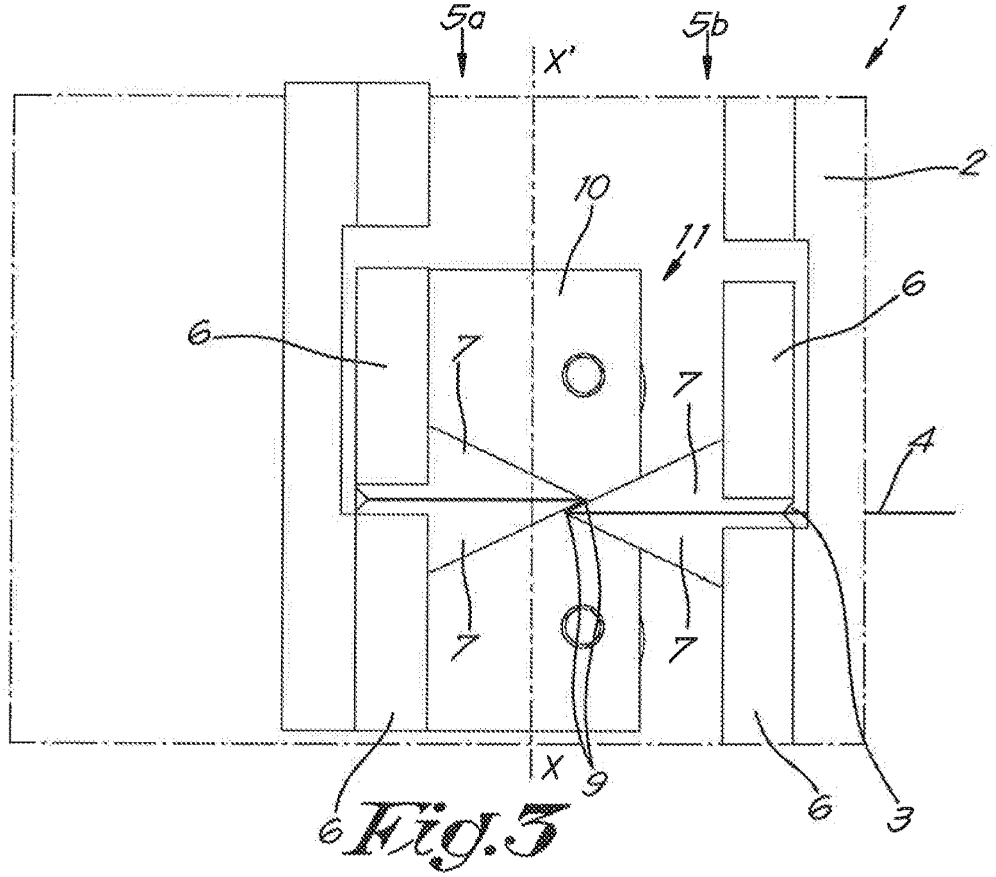
FIG. 5 schematically shows a movement mechanism of the folding device of FIG. 1 in a closed position.
Figure 6:
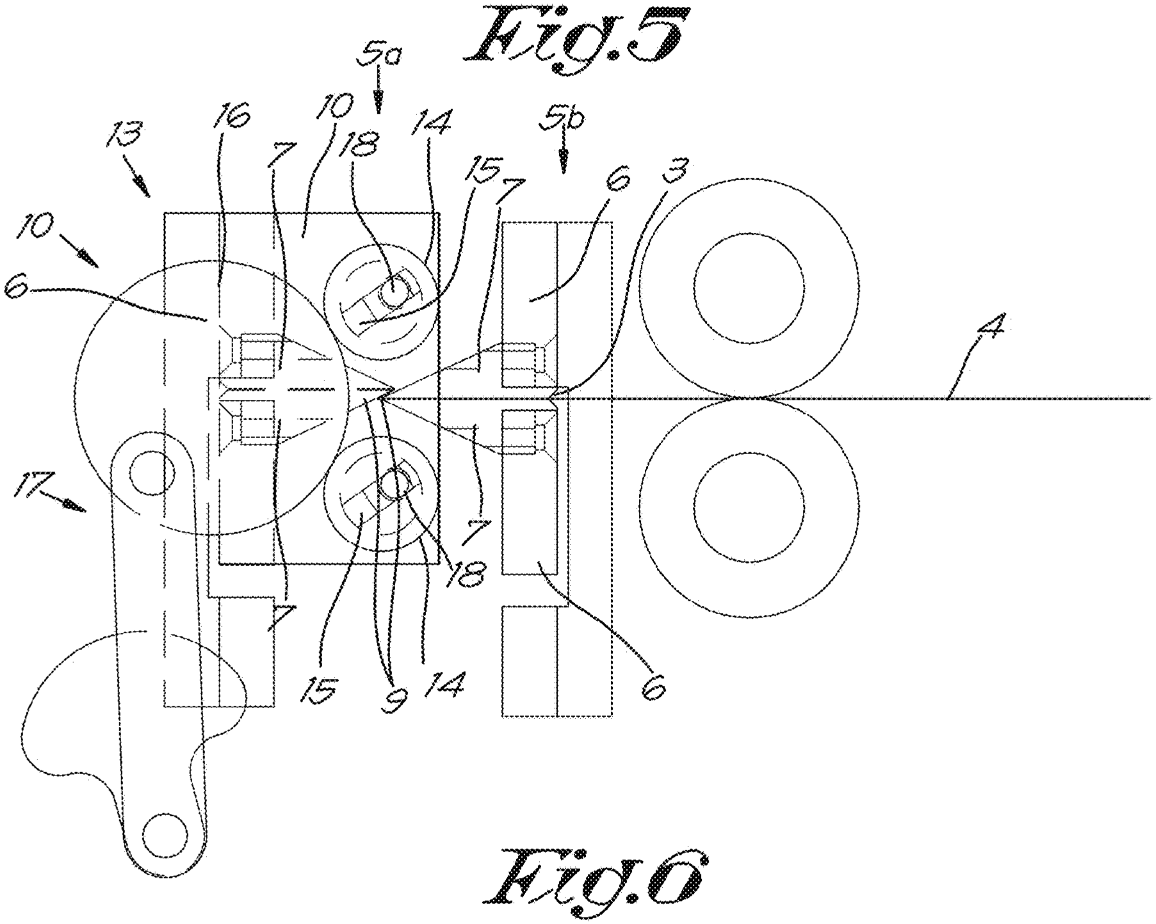
FIG. 6 schematically shows a movement mechanism of the folding device of FIG. 1 in a first rotated position.
Figure 7:
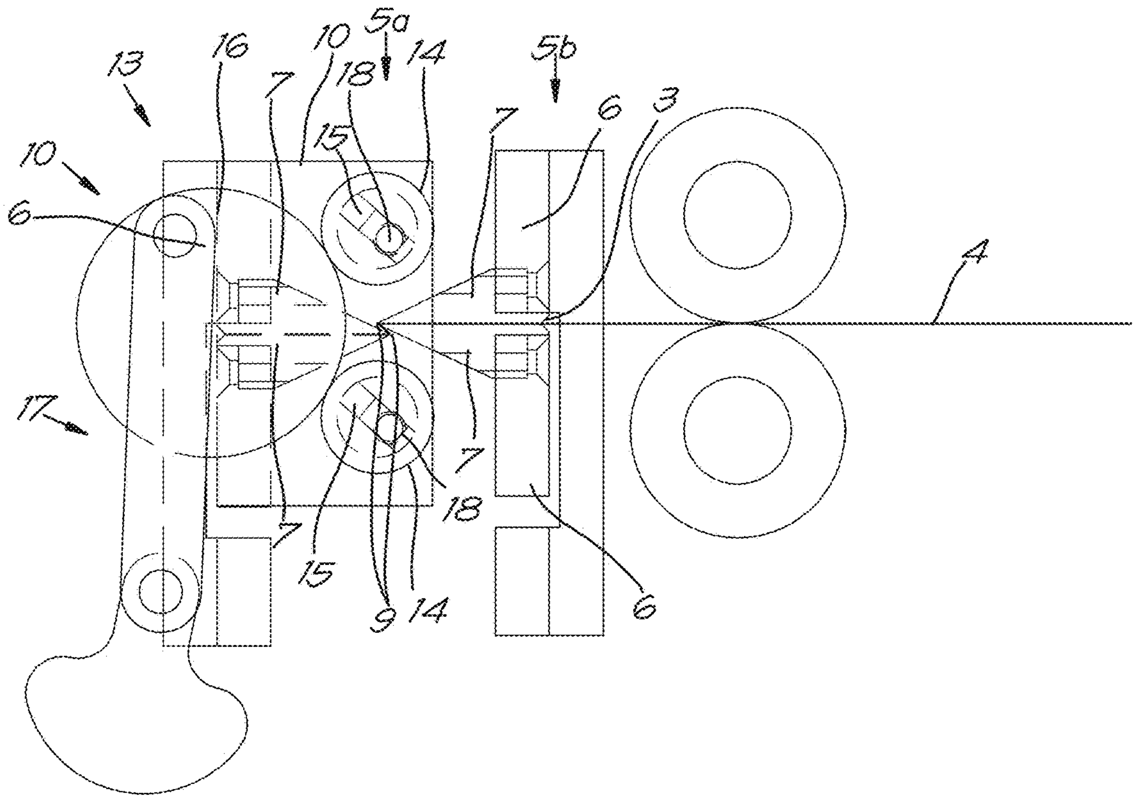
FIG. 7 schematically shows a movement mechanism of the folding device of FIG. 1 in a second rotated position.

The rotating mechanism 11, for example, which will be further explained by FIGS. 5 to 7, which makes the carrier 10 together with the closed clamping bars 6 orbit, in other words makes it as a whole, rotate around the folding edge 9 of the fixed clamp **5*b*, while the carrier 10, and its clamping bars 6** always remain parallel to themselves.

In some embodiments, the folding device 1 is a throughput device which is provided with a supply mechanism 12 to feed the leaves 4 to be folded from a feeder (not shown) between the clamping bars 6 of the opened clamps **5*a* and 5*b*. The supply mechanism 12** is formed, for example, by supply rollers that are controlled by a programmed control.

The folding device 1 is further provided with a positioning mechanism, not shown, to position the leaf 4 to be folded in the feed direction I between the clamping bars 6 in a position whereby the location where the folds need to be made in the leaf 4 are located under the folding edges 9 of the clamps **5*a* and 5*b***.

The positioning mechanism can, for example, contain a detector to detect the end of the leaf when guiding it, said detector being connected to the aforementioned control of the supply mechanism 12.

The operation of the folding device is as follows.

When the leaf 4 is positioned in the right position between the clamping bars 6, the clamps 5*a* and 5*b* are closed and the leaf 4 is clamped as shown in FIG. 2.

The carrier 10 with the clamp 5*a* is then driven to orbit around the folding edge 9 of the fixed clamp 5*b*.

First, the clamp 5*a* is turned upward against or almost against the fixed clamp 5*b* as shown in FIG. 3.

Consequently, the leaf 4 is folded around the folding edges 9 of both clamps 5*a* and 5*b* and two parallel folding lines are formed in the leaf 4 at the desired distance B from each other. It is clear that the folding edge 9 of the fixed clamp 5*b* also makes a relative circular movement around the folding edge 9 of the movable clamp 5*a*.

Figure 4:
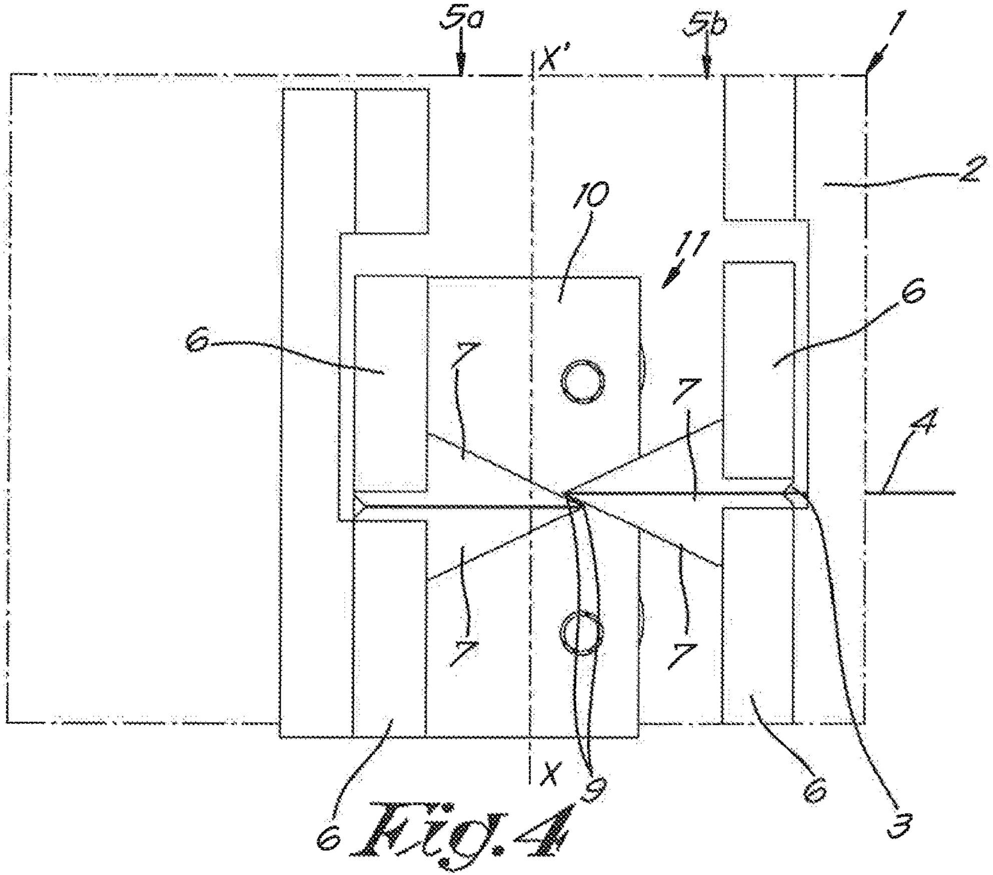
FIG. 4 schematically shows the folding device of FIG. 1 in a second rotated position.
Figure 5:
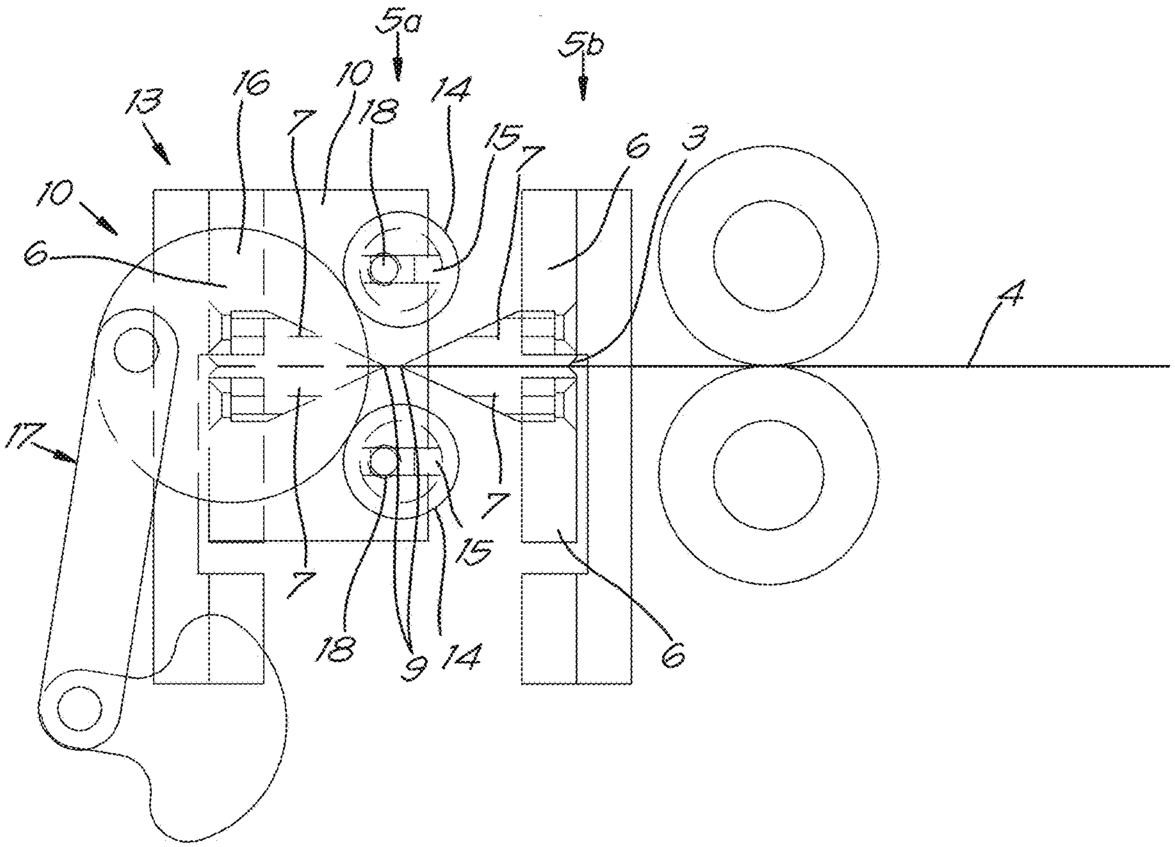

Subsequently, the carrier 10 with the clamp 5*a* is turned downward in the opposite direction around the folding edge 9 of the fixed clamp 5*b* into a position as shown in FIG. 4, whereby the leaf 4 is now folded to its other side, such that the folds are made even sharper.

Due to their narrow opening angle A the clamps 5*a* and 5*b* can be rotated over a big angle relative to each other without hitting each other, in some embodiments this angle is greater than 180°.

In this way the leaf 4 can, if necessary, be folded several times to the one, and the other, side of the leaf 4.

Afterwards, the carrier 10 can be returned to its start position of FIG. 2, after which the clamps 5*a* and 5*b* can be opened and the leaf 4 with the double fold in it can now be guided in the direction I towards a stack (not shown).

An example of how the rotating mechanism 11 can be realised is shown in FIGS. 5 to 7. The rotating mechanism 11 includes a movement mechanism 13 with two disks 14 that are rotatably mounted on bearings in the chassis 2 and which are provided with a radially extending slot 15, the disks 14 being rotatable in a reciprocating manner by a larger dial 16 that can be rotated in a reciprocating manner around a central position, as shown in FIG. 5, by a drive device 17.

The carrier 10 is provided with two fixed pawls 18 which are enclosed moveably in a reciprocating manner in the aforementioned slots 15 of the disks 14.

In the central position of FIG. 5 the clamps 5*a* and 5*b* are located in the start position of FIG. 2 with the clamps 5*a* and 5*b* in each other's extension.

From this central position the dial 16 is first rotated in one direction as shown in FIG. 6 and then in the other direction as shown in FIG. 7, such that the carrier 10 with the clamp 5*a* is given an orbiting movement around the folding edge 9 of the fixed clamp 5*b*, as illustrated in the FIGS. 6 and 7.

Figure 8:
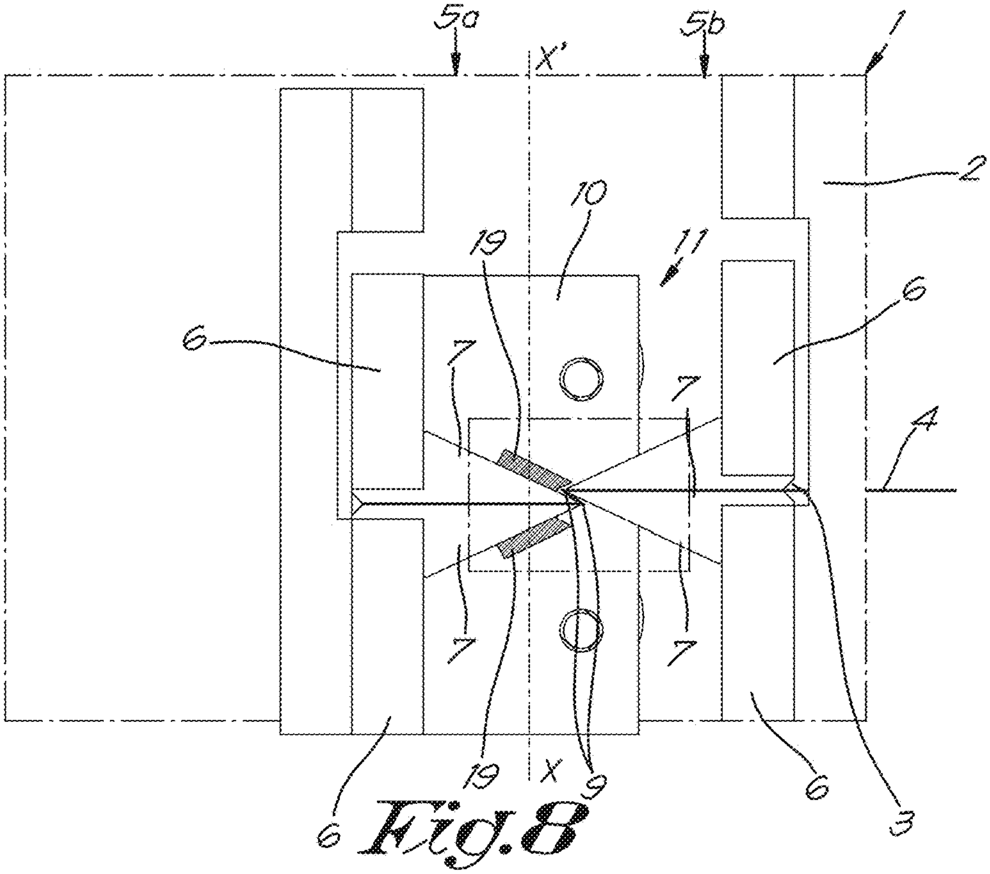
FIG. 8 schematically shows another variant of a folding device according to the present disclosure.
Figure 9:
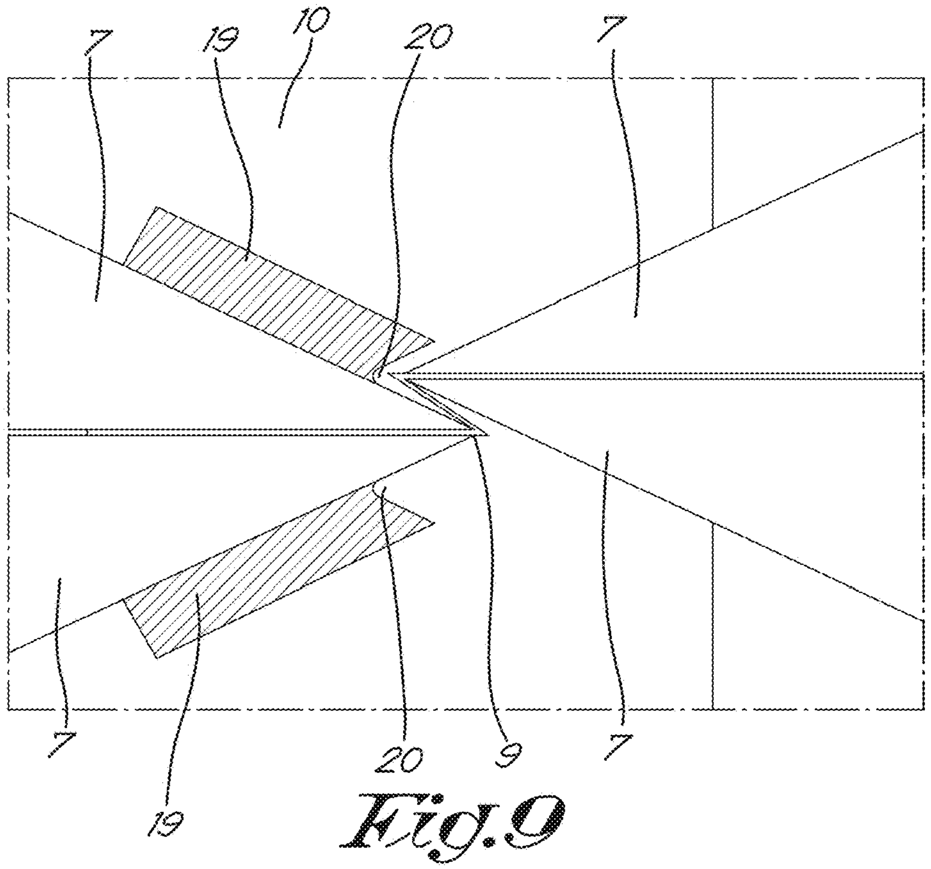
FIG. 9 schematically shows folding edges 9 of FIG. 8 on a larger scale.

Optionally one or both clamps 5*a* and 5*b* can be provided with a stop 19 as shown in the FIGS. 8 and 9 which forms a stop for the folding edge 9 of a clamp 5 at the end of the rotational movement of this clamp 5, whereby the stop 19 is made from an elastic compressible material such as rubber. Due to the stop 19 the double fold can be extra accentuated.

The stop 19, for example, is formed by a notch 20 that forms a seat for the sharp folding edge 9 of the one of the clamps 5*a* and 5*b*.

Figure 10:
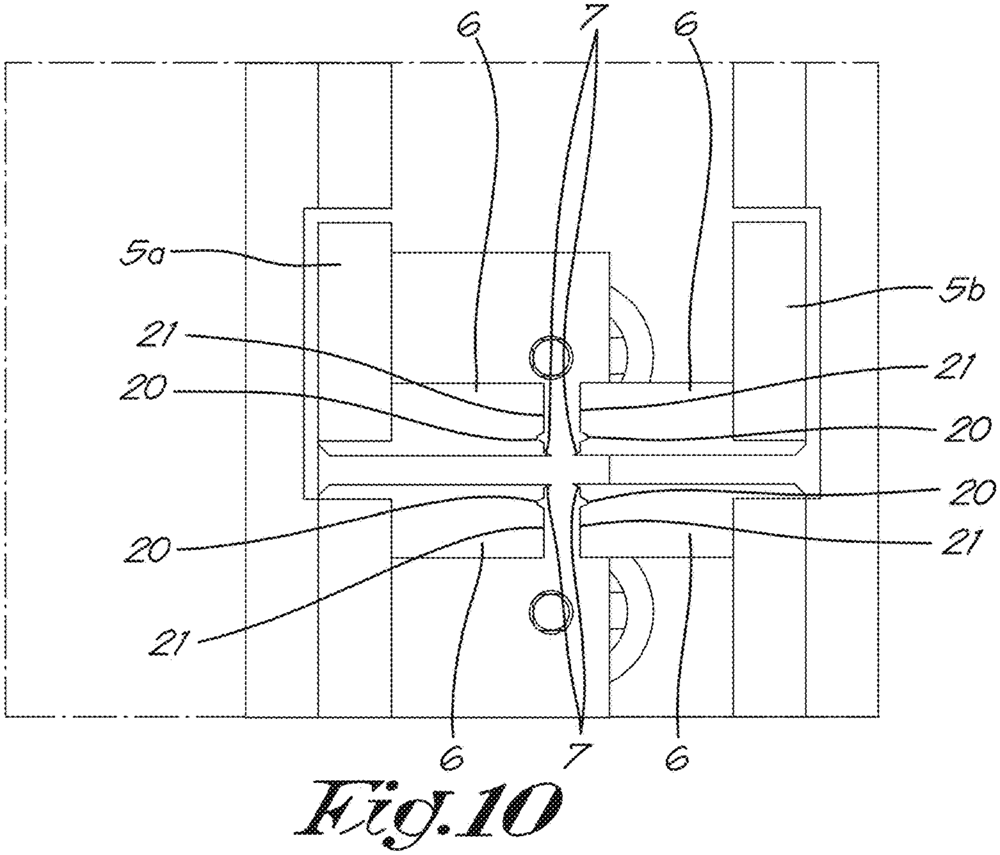
FIG. 10 schematically shows another variant of a folding device according to the present disclosure in idle position.
Figure 11:
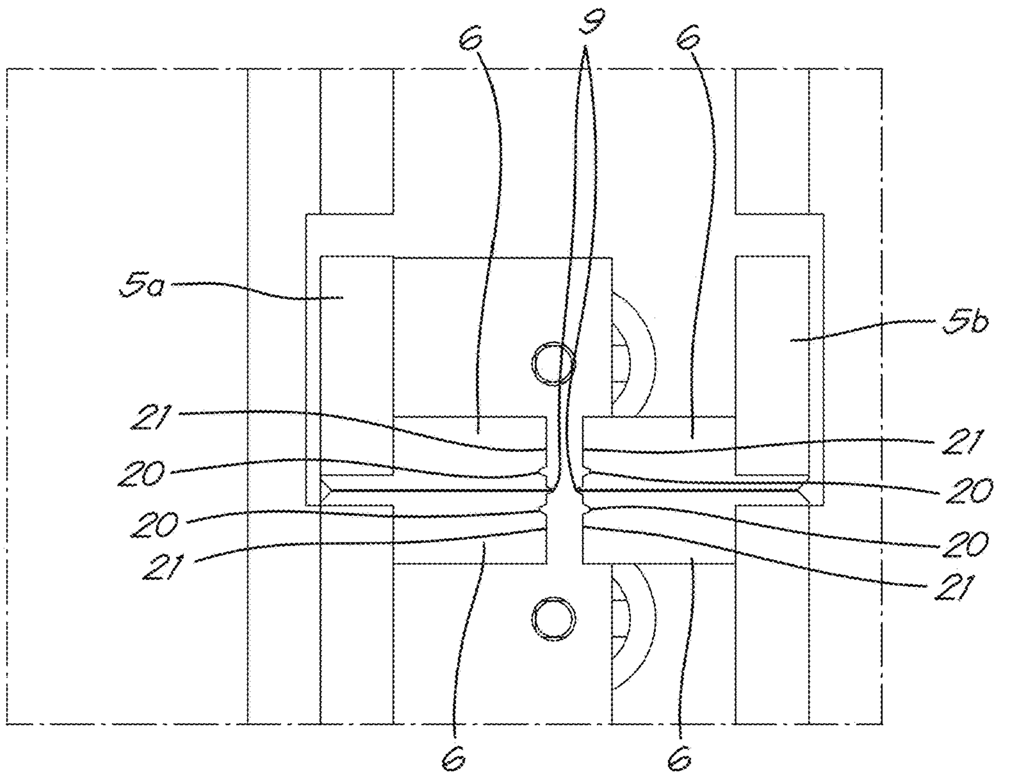
FIG. 11 schematically shows the folding device of FIG. 10 in a closed position.

FIG. 10 shows an alternative embodiment of a folding device 1 according to the present disclosure whereby in this case the clamping bars 6, seen in cross-section, are provided with a square edge 21 that is perpendicular to the feed direction I and from which the aforementioned jaws 7 protrude in the direction of the opposite clamp 5.

Figure 12:
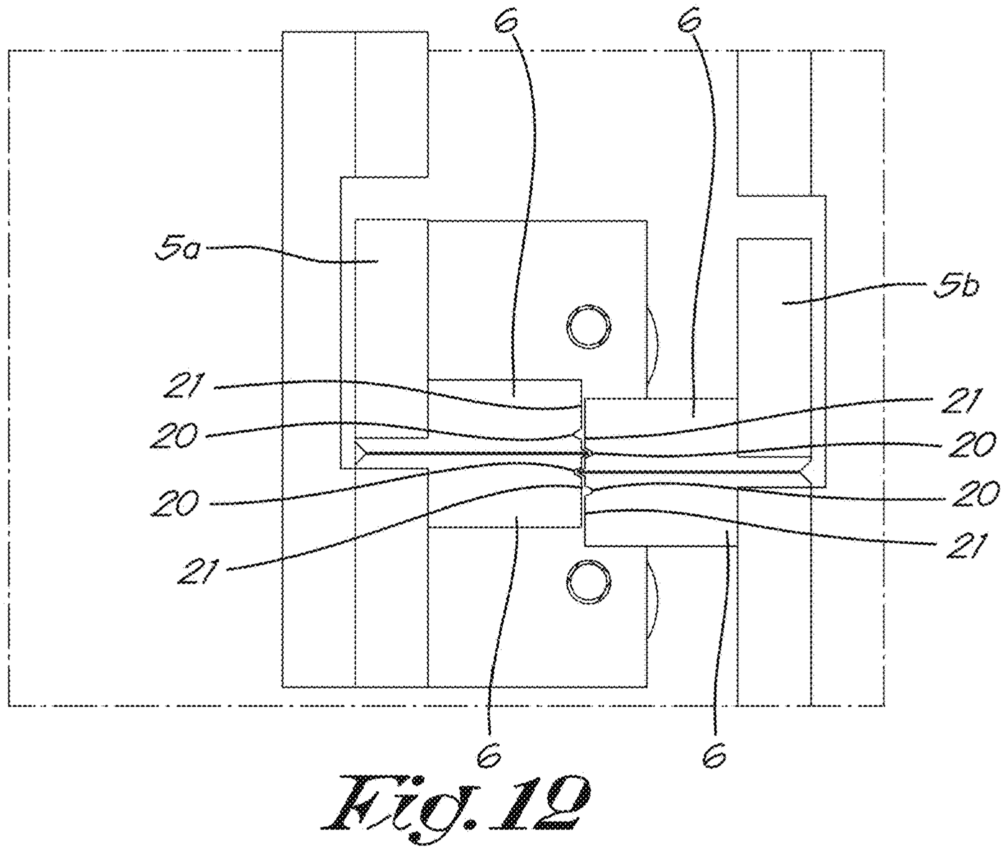
FIG. 12 schematically shows the folding device of FIG. 10 in a first rotated position.
Figure 13:
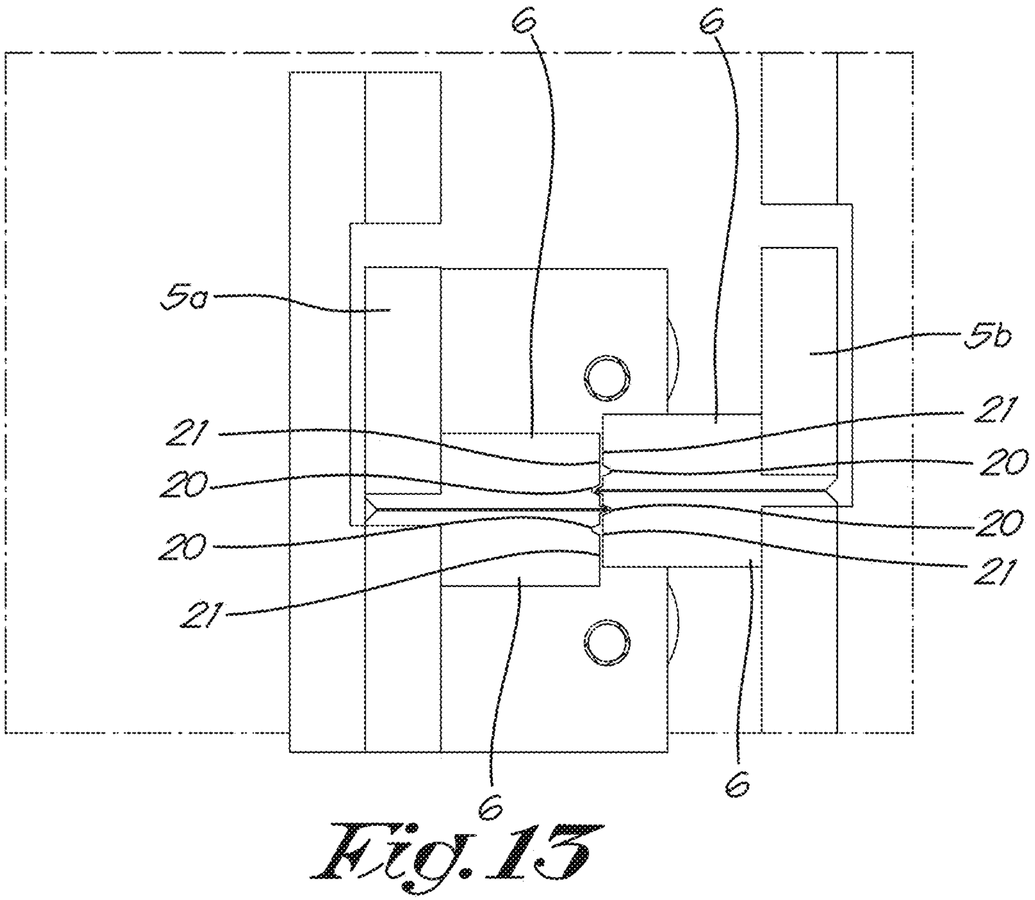
FIG. 13 schematically shows the folding device of FIG. 10 in a second rotated position.

The notches 20 for the folding edge 9 of the clamps are provided as a recess in the square edge 21 and are positioned in such a way that at the end of the rotational movement of the clamp 5 the folding edges 9 fall into these notches 20 as shown in the FIGS. 12 and 13.

For the rest the operation of this folding device 1 is analogue to the operation as already described.

It is clear that the consecutive movements as described above can be controlled from a programmed control that controls all movements or at least part of them.

It is also clear that opening and closing the clamps 5*a* and 5*b* can also be realised in another way, for example by rotating the clamping bars 6 toward each other to close and away from each other to open.

It is also clear that both clamps 5*a* and 5*b* can be movable to impose a relative rotational movement of one of the clamps 5*a* and 5*b* relative to the other of the clamps 5*a* and 5*b*.

It is also clear that with a folding device 1 according to the present disclosure, alternative materials other than paper or cardboard can be folded, for example leaves 4 made from a synthetic material.

The present disclosure is not limited to the embodiments described as an example and shown in the drawings, but a device according to the present disclosure to make two parallel folds in a leaf of paper or the like that can be realised in all kinds of forms and dimensions, without departing from the scope of the present disclosure.

The invention claimed is:

1. A folding device comprising:

a chassis having a feed opening through which a leaf of paper is feed in a feed direction, the leaf of paper having a first end portion and an opposite second end portion;

a first clamp having a pair of first clamping bars, a first pointed jaw is coupled to each of the pair of first clamping bars, the pair of first clamping bars are coupled to the chassis to move the first pointed jaws in a direction perpendicular to the feed direction between a first open position and a first closed position, in the first open position the pair of first pointed jaws are spaced apart to define a first opening that aligns with the feed opening of the chassis to receive the leaf of paper, in the first closed position the first pointed jaws clamp the first end portion of the leaf of paper;

a carrier rotatable coupled to the chassis relative to the first clamp; and a second clamp having a pair of second clamping bars, a second pointed jaw is coupled to each of the pair of second clamping bars, the pair of second clamping bars are coupled to the carrier to move the second pointed jaws in the direction perpendicular to the feed direction between a second open position and a second closed position, in the second open position the second pointed jaws are spaced apart to define a second opening that aligns with the first opening and the feed opening of the chassis to receive the leaf of paper, in the second closed position the second end portion of the leaf of paper is clamped between the second pointed jaws, wherein when the first pointed jaws are in the first closed position and the second pointed jaws are in the second closed position, the carrier is rotated in a first direction to rotate the second clamp relative to first clamp to form a first fold in the leaf of paper and the carrier is rotated in a second direction opposite the first direction to rotate the second clamp relative to the first clamp to form a second fold in the leaf of paper, the second fold parallel to the first fold.

2. The folding device according to claim 1, wherein the first clamp is fixed in the first closed position while the second clamp in the second closed position is rotated by the carrier relative to the fixed clamp.

3. The folding device according to claim 2, wherein the folding device is a throughput device that is provided with a supply mechanism to guide the leaf of paper through the feed opening, the first opening between the first pointed jaws in the first open position, and the second pointed jaws in the second open position from a feeder for the folding and after folding to guide the leaf of paper further and stack the leaf of paper.

4. The folding device according to claim 2, wherein at least one stop is provided on one of the first pointed jaws or the second pointed jaws as a seat for the other of the first pointed jaws or the second pointed jaws at an end of the rotation of the second pointed jaws relative to the first pointed jaws.

5. The folding device according to claim 1, wherein at least one stop is provided on one of the first pointed jaws or the second pointed jaws as a seat for the other of the first pointed jaws or the second pointed jaws at an end of the rotation of the second pointed jaws relative to the first pointed jaws.

6. The folding device according to claim 5, wherein the stop is made from an elastic compressible material such as rubber.

7. The folding device according to claim 6, wherein the stop is formed by a notch to form the seat for the other first pointed jaws or the second pointed jaws.

8. The folding device according to claim 5, wherein the stop is formed by a notch to form the seat for the other first pointed jaws or the second pointed jaws.

9. The folding device according to claim 1, wherein the second pointed jars are rotated relative to the first pointed jaws over an angle of at least 180°.

10. The folding device according to claim 1, wherein an opening angle of the second pointed jaws in the second closed position amounts to approximately 25°.

11. The folding device according to claim 1, wherein the folding device is provided with a positioning mechanism to position the leaf of paper to be folded when the leaf of paper is guided through the feed opening, the first opening between the first pointed jaws in the first open position, and the second pointed jaws in the second open position.

12. The folding device according to claim 11, wherein the positioning mechanism includes a detector to detect one of the first end portion of the second end portion of the leaf of paper when guiding the leaf of paper.

13. The folding device according to claim 1 further comprising:

a pair of disks rotatably mounted to the chassis, each of the pair of disks having a radially extending slot;

a pair of fixed pawls coupled to the carrier, the pair of fixed pawls received within the radially extending slots of the pair of disks; and a rotatable dial that rotates the pair of disks to rotate the second clamp and the carrier relative to the first clamp.

14. A folding device comprising:

a chassis having a feed opening through which a leaf of paper is feed in a feed direction, the leaf of paper having a first end portion and an opposite second end portion;

a first clamp having a pair of first clamping bars and a pair of first pointed jaws, each of the pair of first jaws having a first proximate end and an opposite first distal end, one of the pair of first pointed jaws is coupled at the first proximate end to one of the pair of first clamping bars, and the other of the pair of first pointed jaws is coupled at the first proximate end to the other of the pair of first clamping bars, the pair of first clamping bars are coupled to the chassis to move the pair of first pointed jaws in a direction perpendicular to the feed direction between a first open position and a first closed position, in the first open position the pair of first pointed jaws are spaced apart to define a first opening that aligns with the feed opening of the chassis;

a carrier coupled to the chassis to rotate relative to the first clamp from an initial position to a first rotated position by rotating in a first direction, and rotate from the first rotated position to a second rotated position by rotating in a second direction opposite the first direction; and a second clamp having a pair of second clamping bars and a pair of second pointed jaws, each of the pair of second jaws having a second proximate end and an opposite second distal end, one of the pair of second pointed jaws is coupled at the second proximate end to one of the pair of second clamping bars, and the other of the pair of second pointed jaws is coupled at the second proximate end to the other of the pair of second clamping bars, the pair of second clamping bars are coupled to the carrier to move the pair of second pointed jaws in the direction perpendicular to the feed direction between a second open position and a second closed position in the direction perpendicular to the feed direction, in the second open position the pair of second pointed jaws are spaced apart to define a second opening that aligns with the first opening and the feed opening of the chassis, wherein when the pair of first pointed jaws are in the first closed position the first end portion of the leaf paper is clamped between the pair of first pointed jaws, wherein when the pair of second pointed jaws are in the second closed position the second end portion of the leaf of paper is clamped between the pair of second pointed jaws, wherein when the carrier is in the initial position, the pair of first pointed jaws are in the first closed position, and the pair of second pointed jaws are in the second closed position, the second distal ends of the pair of second pointed jaws are spaced apart in the feed direction from the first distal ends of the pair of first pointed jaws and the second distal ends of the pair of second pointed jaws positioned farther from the opening in the feed direction than the first distal ends of the pair of first pointed jaws, wherein when the carrier is in the first rotated position, the pair of first pointed jaws are in the first closed position, and the pair of second pointed jaws are in the second closed position, the second distal ends of the pair of second pointed jaws are positioned one a first side of the pair of first pointed jaws, and the second distal ends of the pair of second pointed jaws are positioned closer to the opening in the feed direction than the first distal ends of the pair of first pointed jaws to form a first fold in the leaf of paper between the first end portion and the second end portion, and wherein when the carrier is in the second rotated position, the pair of first pointed jaws are in the first closed position, and the pair of second pointed jaws are in the second closed position, the second distal ends of the pair of second pointed jaws are positioned one a second side opposite the first side of the pair of first pointed jaws, and the second distal ends of the pair of second pointed jaws are positioned closer to the opening in the feed direction than the first distal ends of the pair of first pointed jaws to form a second fold in the leaf of paper between the first end portion and the second end portion.

15. The folding device according to claim 14, wherein the first clamp is fixed in the first closed position while the second clamp in the second closed position is rotated by the carrier relative to the fixed clamp.

16. The folding device according to claim 14, wherein at least one stop is provided on one of the first pointed jaws or the second pointed jaws as a seat for the other of the first pointed jaws or the second pointed jaws at an end of the rotation of the second pointed jaws relative to the first pointed jaws.

17. The folding device according to claim 14 further comprising:

a pair of disks rotatably mounted to the chassis, each of the pair of disks having a radially extending slot;

a pair of fixed pawls coupled to the carrier, the pair of fixed pawls received within the radially extending slots of the pair of disks; and a rotatable dial that rotates the pair of disks to rotate the second clamp and the carrier relative to the first clamp.

* * * * *